United States Patent Office 3,297,427
Patented Jan. 10, 1967

1

3,297,427
SYNERGISTIC HERBICIDAL COMPOSITION
AND METHOD
Sidney B. Richter, Chicago, Ill., assignor to Velsicol Chemical Corporation, Chicago, Ill., a corporation of Illinois
No Drawing. Filed Dec. 15, 1965, Ser. No. 514,106
9 Claims. (Cl. 71—2.6)

This application is a continuation-in-part of application Serial No. 355,112, filed March 26, 1964, now abandoned.

This invention relates to new herbicidal compositions of matter. More specifically, this invention relates to new compositions comprising a compound selected from the group consisting of 2-methoxy-3,6-dichlorobenzoic acid, 2-methoxy-3,5,6-trichlorobenzoic acid, the anhydrides, esters in which the esterifying group contains up to ten carbon atoms, alkali metal and amine salts, amides in which the amine component contains up to ten carbon atoms of said benzoic acids and mixtures thereof, and herbicides of the phenoxyacetic acid class. An embodiment of this invention is a composition comprising 2-methoxy-3,6-dichlorobenzoic acid, 2-methoxy-3,5,6-trichlorobenzoic acid and herbicides of the phenoxyacetic acid class.

A wide variety of commercial herbicides based on chemical compounds containing the phenoxyacetic acid nucleus is known. Such compounds, for example, as 2,4-D (2,4-dichlorophenoxyacetic acid), MCPA (2-methyl-4-chlorophenoxyacetic acid), and 2,4,5-T (2,4,5-trichlorophenoxyacetic acid) are the most well known of this class of herbicides. Other examples are p-chlorophenoxyacetic acid,
2,5-dichlorophenoxyacetic acid,
3,4-dichlorophenoxyacetic acid,
2-methyl-5-bromophenoxyacetic acid,
2-bromophenoxyacetic acid,
3-chloro-5-methylphenoxyacetic acid,
2-methyl-5-chlorophenoxyacetic acid,
2-chlorophenoxyacetic acid,
3-chlorophenoxyacetic acid,
2,3-dichlorophenoxyacetic acid,
3,5-dimethylphenoxyacetic acid,
2-isopropyl-5-methylphenoxyacetic acid, and the like.

It has now been found that valuable herbicidal compositions can be prepared from such phenoxyacetic acid compounds and either 2-methoxy-3,6-dichlorobenzoic acid or 2-methoxy-3,5,6-trichlorobenzoic acid. The benzoic acid compounds named have the structure

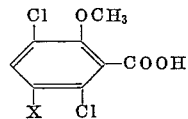

wherein X is hydrogen or chlorine. These compounds can be obtained by treating alkali metal salts of 3,6-dichlorosalicylic acid or 3,5,6-trichlorosalicylic acid with a methylating agent such as dimethyl sulfate in alkaline medium and hydrolyzing any ester which may be formed. The new compositions of this invention can comprise the 2-methoxy-3,6-dichlorobenzoic acid or 2-methoxy-3,5,6-trichlorobenzoic acids as well as the phenoxyacetic acid compounds not only in the form of the free acids, but also

2 in the form of their anhydrides, esters, alkali metal salts, amine salts, amides, or other derivatives. Such useful derivatives can be prepared readily from 2-methoxy-3,6-dichlorobenzoic acid or 2-methoxy-3,5,6-trichlorobenzoic acid as the free acids.

The anhydrides, for example, can be prepared by the removal of one molecule of water from two molecules of the free acid. In practice, it is convenient to prepare the anhydride by the acylation of the free carboxylic acid by its acid halide in the presence of a strong acylating agent such as pyridine. Thus, a mixture of dry pyridine and dry benzene is treated with 1 mole of the acid chloride of the particular acid. The slightly exothermic reaction proceeds with the formation of an intermediate pyridinium salt. One mole of the free acid is then added, the precipitate of the pyridine hydrochloride is removed, and the anhydride is isolated by removal of the benzene.

The acid halides required in the above and other syntheses can be prepared by the reaction of the free acid with a phosphorus trihalide in the conventional manner. Thus, the treatment of 2-methoxy-3,6-dichlorobenzoic acid with phosphorus trichloride, until the reaction ceases, produces the acid chloride.

Compounds which are salts, esters, or amides of these compounds can be prepared readily from the free acid. Thus, treatment of 2-methoxy-3,6-dichlorobenzoic acid with ammonium hydroxide gives a product which is the salt ammonium 2-methoxy-3,6-dichlorobenzoate. Similarly, an alkali metal salt can be made by the treatment of the free acid with bases, such as the hydroxides of alkali metals. Treatment of the acid with sodium hydroxide thus gives the salt sodium 2-methoxy-3,6-dichlorobenzoate as the product, while the use of potassium hydroxide gives the salt potassium 2-methoxy-3,6-dichlorobenzoate.

Amine salts can be prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamine, trimethylamine, triethylamine, diethanolamine, triethanolamine, isopropylamine, and morpholine salts of 2-methoxy-3,6-dichlorobenzoic acid or of 2-methoxy-3,5,6-trichlorobenzoic acid.

Esters can be prepared by the condensation of the acid with various alcohols. Thus, the condensation of methyl alcohol with 2-methoxy-3,6-dichlorobenzoic acid gives the desired ester, methyl 2-methoxy-3,6-dichloro-benzoate. Other typical alcohols which can be used are propyl, isopropyl, n-butyl, sec-butyl, isobutyl, tert-butyl, amyl, hexyl, heptyl, octyl, nonyl, decyl, and the like. The products are the corresponding alkyl esters of 2-methoxy-3,6-dichlorobenzoic acid or 2-methoxy-3,5,6-trichlorobenzoic acid. Although such complex esters as those prepared by esterification with butoxyethanol, propylene glycol butyl ether, and the like are useful products in accordance with this invention, preferred esters are those in which the esterifying group is an unsubstituted alkyl group which contains from 1 to 10 carbon atoms. The condensation of the acid with the alcohol can be carried out suitably in an inert solvent such as an aromatic hydrocarbon and in the presence of a few percent by weight of an acid catalyst such as p-toluenesulfonic acid. The water which forms during the esterification reaction can be removed continuously in many cases from the reaction mixture by distillation as it forms, and its volume can be measured to determine when the esterification is complete. The ester is then isolated by distillation of the inert solvent.

Amides can be prepared conveniently by the reaction of the acid halide of the acid with ammonia or various amines. The reaction can be carried out in an inert solvent such as ether or benzene. Preferably two moles of the amine are used for each mole of the acid halide employed, since the hydrogen halide released during the reaction is taken up by some of the free amine which remains. The simplest amide, 2-methoxy-3,6-dichlorobenzamide or 2-methoxy-3,5,6-trichlorobenzamide, can be prepared by the reaction of the acid chloride with ammonia, either as the free gas or as an aqueous solution. This amide can also be prepared by hydrolysis of the corresponding nitrile. Substituted amides can be prepared by the reaction of the acid halide with amines such as any of the primary or secondary amines suggested above for the preparation of the amine salts. Thus, for example, the reaction of the acid chloride of 2-methoxy-3,6-dichlorobenzoic acid with methylamine, butylamine, decylamine, or diethylamine gives the N-methyl-, N-butyl-, N-decyl-, or N,N-diethyl-2-methoxy-3,6-dichlorobenzamides, respectively. While more complex amines such as the aromatic amines can be used as the amine reactant to give desirable products, which are specifically named as anilides, preferred amine reactants are alkylamines containing up to 10 carbon atoms.

The manner in which the free acids themselves, namely 2-methoxy-3,6-dichlorobenzoic acid and 2-methoxy-3,5,6-trichlorobenzoic acid, can be obtained is illustrated in the following examples. All temperatures are in degrees Centigrade.

*Example I.—Preparation of 2-methoxy-3,6-dichlorobenzoic acid*

3,6-dichlorosalicyclic acid (210 g.; 0.87 mole) dissolved in 139 g. (3.48 moles) of sodium hydroxide in 900 ml. water is cooled to 20° and treated with dimethyl sulfate (219 g.; 1.74 moles) with vigorous stirring. The mixture is stirred for 20 minutes at a temperature below 20° (ice cooling), whereupon another 139 g. of dimethyl sulfate is added, and the mixture is stirred for 10 minutes at a temperature below 45°. The mixture is then refluxed for 2 hours, treated with a solution of 69.6 g. of sodium hydroxide in 250 ml. water, refluxed an additional 2 hours, cooled and acidified to Congo red with hydrochloric acid. The precipitated solid is filtered, dissolved in dry ether, dried over magnesium sulfate, and filtered. Removal of the ether in vacuo gives a viscous oil, which can be dried to a solid at room temperature in a vacuum oven to yield 125 g. (65% of theory) of pale yellow 2-methoxy-3,6-dichlorobenzoic acid, melting at 113 to 115°. Recrystallization from pentane gives white crystals, melting at 114 to 116°.

*Example II.—Preparation of 2-methoxy-3,5,6-trichlorobenzoic acid*

3,5,6-trichlorosalicyclic acid in aqueous sodium hydroxide solution can be treated with dimethyl sulfate in the manner described in Example I to give a 65% yield of 2-methoxy-3,5,6-trichlorobenzoic acid, which melts at 137 to 139° when crystallized from an alcohol-water mixture. The methyl ester is a colorless liquid, B.P. 140°/0.5 mm.

Herbicidal compositions of this invention can be prepared by mixing the active compounds with inert carriers to provide formulations adapted for ready and efficient application with conventional applicator equipment to the site of the weed infestation. For example, herbicidal compositions or formulations according to this invention can be prepared in the form of solids or liquids. Solid compositions are preferably in the form of dusts or granular formulations. For example, homogeneous, free-flowing dusts can be made by admixing the active compounds with finely divided solids such as the talcs, natural clays, prophyllite, diatomaceous earth, fuller's earth, or flours such as walnut shell, wheat, redwood, soya bean, or cottonseed flours. Other inert solid carriers of the type ordinarily used in preparing pest control compositions in dust or granular form can also be used.

Liquid compositions according to this invention can be prepared by admixing the compounds with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the herbicidal compositions of this invention can also contain a surface-active agent of the kind used in the art to enable the active compounds to be readily dispersed in water or other liquids to give sprays, which are a desirable method of applying the active compounds in this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of lignonsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene polyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the herbicidal compositions.

Other pesticides as well as such substances as fertilizers, activators, adhesives, spreaders, and synergists can be added to these formulations if desired.

The compositions of this invention will ordinarily comprise from 0.5 to about 95% by weight of the active compounds.

The manner in which typical herbicidal compositions according to this invention can be prepared is illustrated in the following examples where all quantities given are in parts by weight:

*Example III.—Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| 2-methoxy-3,6-dichlorobenzoic acid | 5 |
| 2,4-dichlorophenoxyacetic acid | 20 |
| Sodium lauryl sulfate | 2 |
| Sodium lignin sulfonate | 3 |
| Kerosene | 70 |

*Example IV.—Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| 2-methoxy-3,5,6-trichlorobenzoic acid | 10.00 |
| 2,4,5-trichlorophenoxyacetic acid | 65.00 |
| Fuller's earth | 22.75 |
| Sodium lauryl sulfate | 2.00 |
| Methyl cellulose | .25 |

*Example V.—Preparation of an oil-dispersible powder*

The following components are blended and ground as described in the previous example to give a powder which can be dispersed in oil to form a spray containing the desired concentration of active compound.

| | |
|---|---|
| Butoxyethanol ester of 2-methoxy-3,6-dichlorobenzoic acid | 5 |
| Ethyl ester of 2,4-dichlorophenoxyacetic acid | 65 |
| Condensation product of diamylphenol with ethylene oxide | 4 |
| Fuller's earth | 26 |

*Example VI.—Preparation of a dust*

The following ingredients are mixed thoroughly and then ground to an average particle size of less than about 50 microns to give a dust suitable for application with conventional dusting equipment.

| | |
|---|---|
| Dimethylamine salt of 2-methoxy-3,5,6-trichlorobenzoic acid | 10 |
| Dimethylamine salt of 2-methyl-4-chlorophenoxyacetic acid | 10 |
| Talc | 80 |

*Example VII.—Preparation of a granular formulation*

The following ingredients are mixed with sufficient water to form a paste, which is then extruded, dried, and ground to give granules, preferably from about $\frac{1}{32}$ to $\frac{1}{4}$ inch in diameter. The granules are applied with fertilizer spreader equipment or other conventional apparatus. The dextrin in this formulation serves as a binding agent.

| | |
|---|---|
| Sodium 2-methoxy-3,6-dichlorobenzoate | 5 |
| Sodium 2-methyl-4-chlorophenoxyacetate | 5 |
| Fuller's earth | 66 |
| Dextrin | 20 |
| Sodium lignin sulfonate | 3 |
| Kerosene | 1 |

In applying the herbicidal compositions of this invention, consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older the weeds the higher the concentration needed to kill them. Summer annuals such as lambsquarters, pigweeds, cocklebur, and sunflower should be sprayed when they are less than 4 inches high. Winter annuals such as various mustards, fan-weed, yellow starthistle, and wild radish are most easily killed while they are still in the rosette stage. Usually weeds growing rapidly under optimum conditions are relatively susceptible, whereas those growing under adverse conditions tend to be resistant to the herbicide sprays.

The effectiveness of the compositions of this invention in small quantities makes them economically sound for weed control on large areas, with a great saving in labor and cost, in addition to corresponding crop increases. These compositions are particularly valuable in weed control because they are harmful to many weeds but harmless or relatively harmless to some cultivated crops. Minute quantities in contact with plant tissues may be absorbed and translocated to all parts of the plant, causing striking changes in the form and functions and often resulting in their death. The actual amount of composition to be used depends on the variety of factors but is influenced primarily by the species of undesirable plant to be controlled. Thus, while fractions of a pound of the active compounds or their equivalent of an ester, salt, amide, or anhydride are often sufficient for weed control on an acre of corn, seed flax, perennial grass seed crops, pastures or grazing areas (without legumes), wheat, and the like, the particular species of weeds encountered in evergreen and deciduous dormant nursery stock, nursery conifers, waste areas, woody brush, and the like may require the use of one or more pounds of active compounds per acre for good control. Dosage adjustments with the low-volume, low-pressure applications suggested can be made by changing the nozzle size, nozzle spacing, pressure, or traveling rate of the spray equipment.

A wide variety of proportions of the 2-methoxy-3,6-dichlorobenzoic acid or the 2-methoxy-3,5,6-trichlorobenzoic acid in respect to the phenoxyacetic acid class herbicides can be used in the new compositions of this invention. Generally, from about 5 parts to about 75 parts by weight of the benzoic acid derivative will be used for each 100 parts by weight of the phenoxyacetic acid class herbicide.

The molar ratio of the herbicides of the phenoxyacetic acid class to the compound selected from the group consisting of 2-methoxy-3,6-dichlorobenzoic acid or 2-methoxy-3,5,6-trichlorobenzoic acid or the derivatives of said benzoic acids should be at least 1:1, with the preferred embodiment of this invention being in about a 1:1 ratio. The molar ratio of the herbicides of the phenoxyacetic acid class to the compound selected from the group consisting of 2-methoxy-3,6-dichlorobenzoic acid or its derivatives and to the compound selected from the group consisting of 2-methoxy-3,5,6-trichlorobenzoic acid or its derivatives when the three components are all included in the mixture should be in the range of from about 1:1:1 to about 3:1:3.

The herbicidal activity of the new compositions of this invention can be illustrated by any of the established testing techniques known to the art. For example, a series of tests were run in which the test mixtures were formulated as aqueous emulsions and sprayed at various dosages on the foliage of crop plants and weeds that had attained a prescribed size. After being sprayed the plants were placed in a greenhouse and watered either daily or more frequently. Water was not applied to the foliage of treated plants. The type and severity of injury to each crop and weed was determined 13 days after the plants were treated. The degree of injury was rated on a 0 to 10 scale as follows: 0=no injury; 1, 2=slight injury; 3, 4=moderate injury; 5, 6=moderately severe injury; 7, 8, 9=severe injury; 10=death. Some of the results of these tests are presented in the following table:

TABLE I.—MIXTURES OF 2-METHOXY-3,6-DICHLOROBENZOIC ACID AND 2,4-DICHLOROPHENOXYACETIC ACID

| Weed | Test Composition [1] | Injury Rating | Type of Injury |
|---|---|---|---|
| Dock | Composition A | 9 | Epinasty, stunting, local necrosis. |
| Do | Composition B | 9 | Do. |
| Do | Composition C | 9 | Do. |
| Control | Acetone | 0 | Epinasty, stunting. |
| Mustard | Composition D | 9 | Hypertrophy. |
| Do | Composition E | 9 | Do. |
| Do | Composition F | 10 | General necrosis. |
| Do | Composition G | 10 | Do. |
| Do | Composition H | 10 | Do. |
| Do | Composition I | 9 | Epinasty, stunting, local necrosis. |
| Control | Acetone | 0 | |
| Pigweed | Composition J | 10 | General necrosis. |
| Do | Composition K | 10 | Do. |
| Do | Composition L | 10 | Do. |
| Do | Composition M | 9 | Epinasty, stunting, local necrosis. |
| Do | Composition N | 10 | General necrosis. |
| Control | Acetone | 0 | |

[1] See the following table:

| Compositions | Concentration 2-methoxy-3,6-dichlorobenzoic acid (lbs./acre) | Concentration 2,4-dichlorophenoxyacetic acid (lbs./acre) |
|---|---|---|
| A | 1/8 | 1/8 |
| B | 1/8 | 1/4 |
| C | 1/8 | 1/2 |
| D | 1/16 | 1/8 |
| E | 1/16 | 1/4 |
| F | 1/16 | 1/2 |
| G | 1/8 | 1/8 |
| H | 1/8 | 1/4 |
| I | 1/8 | 1/2 |
| J | 1/16 | 1/4 |
| K | 1/16 | 1/2 |
| L | 1/8 | 1/8 |
| M | 1/8 | 1/4 |
| N | 1/8 | 1/2 |

It is also significant to note that mixtures of the present invention possess synergistic effects, i.e., whereas neither individual compound may exhibit effective herbicidal results, the combination will produce better results.

To illustrate this synergism, various comparative tests may be run such as applying a mixture of 2-methoxy-3,6-dichlorobenzoic acid and the dimethylamine salt of 2-methyl-4-chlorophenoxyacetic acid to plots of wheat and oats infested with a uniform stand of wild buckwheat and comparing the effectiveness of this formulation in controlling the weeds with the results obtained when the individual compounds are applied separately. The wild buckwheat was in the 2–4 leaf stage at the first date of treatment; the second treatment was applied two weeks later. All plant counts were taken just before harvest.

| Test Composition | Concentration (lbs./acre) | Weed Growth (Wt. of weeds harvested expressed in grams) | |
|---|---|---|---|
| | | Early Application | Late Application |
| Dimethylamine Salt of 2-methyl-4-chlorophenoxyacetic acid | 8 | 4.0 | 8.0 |
| Butyl Ester of 2-methyl-4-chlorophenoxyacetic acid | 8 | 8.0 | 7.4 |
| Mixture [1] | | 0 | 2.0 |

[1] 2-Methoxy-3,6-dichlorobenzoic acid concentration is 4 lbs./acre and the dimethylamine salt of 2-methyl-4-chlorophenoxyacetic acid concentration is also 4 lbs./acre.

In addition to the foregoing test showing the synergistic effect of the present compositions, the following tests were also performed on a variety of weed species. Each of these tests exhibits the advantage of using the present combination of herbicides.

(1) Tests were performed on the control of Gray Rabbit Brush. 2-methoxy-3,6-dichlorobenzoic acid when applied alone at a rate of 2 pounds per acre showed 30% control. The butyl ester of 2,4-dicholorophenoxyacetic acid when applied at a rate of 2 pounds per acre showed an average of 45% control. A combination of ¼ pound of each material showed an average control of 92.5%.

(2) Tests were then performed to determine the present control of Tansy Ragwort. An amine salt of 2,4-dichlorophenoxyacetic acid when applied at a rate of 2 pounds per acre gave an average control of 15%. 2-methoxy-3,6-dichlorobenzoic acid when applied at a rate of 1 pound per acre gave 55% control and when applied at a rate of 2 pounds per acre gave 70% control. The combination of ¼ pound of 2-methoxy-3,6-dicholorobenzoic acid and 1 pound of an amine salt of 2,4-dichlorophenoxyacetic acid gave an average percent control of 75.

(3) Tests were then performed on the control of Fiddleneck. 2-methoxy-3,6-dicholorobenzoic acid when applied alone at a rate of ¼ pound per acre resulted in 40% control. The amine of 2,4-dicholorophenoxyacetic acid when applied at a rate of ¾ and 1½ pounds per acre resulted in average controls of 70 and 75% respectively. A combination of ¼ pound of 2-methoxy-3,6-dicholorobenzoic acid and ¾ pound of the amine of 2,4-dichlorophenoxyacetic acid resulted in 96% control.

(4) Tests were then performed on the control of Spurry. The amine of 2,4-dichlorophenoxyacetic acid at a rate of 1½ pounds per acre gave no control. 2-methoxy-3,6-dicholorobenzoic acid at a rate of ¼ pound per acre gave 55% control. The combination of ¼ pound of 2-methoxy-3,6-dicholorobenzoic acid and ¾ pound of the amine of 2,4-dichlorophenoxyacetic acid resulted in 70% control.

I claim:

1. A herbicidal composition comprising a herbicidally toxic amount of a combination of a herbicide of the phenoxyacetic acid class selected from the group consisting of 2,4-dichlorophenoxyacetic acid, 2,4,5-trichlorophenoxyacetic acid, 2-methyl-4-chlorophenoxyacetic acid, its esters in which the esterification group contains up to 10 carbon atoms, alkali metal and amine salts in which the amine component contains up to 10 carbon atoms and a second herbicide selected from the group consisting of 2-methoxy, 3,6-dichlorobenzoic acid, 2-methoxy-3,5,6-trichlorobenzoic acid, its esters in which the esterifying group contains up to ten carbon atoms, alkali metal and amine salts, in which the amine component contains up to ten carbon atoms; and an inert diluent therefor.

2. A composition of claim 1 wherein the molar ratio of the herbicide of the phenoxyacetic acid class to the second herbicide is at least about 1:1.

3. A composition of claim 1 wherein the molar ratio of the herbicide of the phenoxyacetic acid class to the second herbicide is about 1:1.

4. A composition as described in claim 1 wherein the phenoxyacetate acid class herbicide is sodium 2-methyl-4-chlorophenoxyacetate and the second herbicide is sodium 2-methoxy-3,6-dichlorobenzoate.

5. A composition as described in claim 1 wherein the phenoxyacetic acid class herbicide is the dimethylamine salt of 2-methyl-4-chlorophenoxyacetic acid and the second herbicide is the dimethylamine salt of 2-methoxy-3,6-dichlorobenzoic acid.

6. A composition as described in claim 1 wherein the phenoxyacetic acid class herbicide is sodium 2,4-dichlorophenoxyacetate and the second herbicide is sodium 2-methoxy-3,6-dichlorobenzoate.

7. A composition as described in claim 1 wherein the phenoxyacetic acid class herbicide is the dimethylamine salt of 2,4-dichlorophenoxyacetic acid and the second herbicide is the dimethylamine salt of 2-methoxy-3,6-dichlorobenzoic acid.

8. A composition as described in claim 1 wherein the phenoxyacetic acid class herbicide is the butoxyethanol ester of 3,4-dichlorophenoxyacetic acid and the second herbicide is the butoxyethanol ester of 2-methoxy-3,6-dichlorobenzoic acid.

9. A method for the control of weeds which comprises applying to the locus of the weed infestation a composition of claim 1 in a quantity toxic to the weeds.

References Cited by the Examiner

UNITED STATES PATENTS

| 2,992,913 | 7/1961 | Pfeiffer | 71—2.6 |
| 3,012,870 | 12/1961 | Richter | 71—2.6 |
| 3,013,054 | 12/1961 | Richter | 71—2.6 XR |
| 3,013,055 | 12/1961 | Richter | 71—2.6 XR |
| 3,231,362 | 1/1966 | Pfeiffer | 71—2.6 |

LEWIS GOTTS, *Primary Examiner.*

JAMES O. THOMAS, *Examiner.*

ALBERT J. ADAMCIK, *Assistant Examiner.*

UNITED STATES PATENT OFFICE
CERTIFICATE OF CORRECTION

Patent No. 3,297,427                                              January 10, 1967

Sidney B. Richter

It is hereby certified that error appears in the above numbered patent requiring correction and that the said Letters Patent should read as corrected below.

In the heading to the printed specification, line 4, for "Velsico" read -- Velsicol --; column 4, line 1, for "prophyllite" read -- pyrophyllite --; column 6, TABLE I, line 4 thereof, for "Control----------Acetone-----------0 Epinasty, stunting"
                              read
--Control----------Acetone-----------0 -------    --;
same TABLE, line 5 thereof, for "Mustard----------Composition D------------9 Hypertrophy"
                              read
--Mustard----------Composition D------------9 Epinasty,
                                                          stunting,
                                                          hypertrophy --.

Signed and sealed this 24th day of October 1967.

(SEAL)
Attest:

EDWARD M. FLETCHER, JR.                         EDWARD J. BRENNER
Attesting Officer                               Commissioner of Patents

UNITED STATES PATENT OFFICE

CERTIFICATE OF CORRECTION

Patent No. 3,297,427                                January 10, 1967

Sidney B. Richter

It is certified that error appears in the above identified patent and that said Letters Patent are hereby corrected as shown below:

Column 1, line 11, after "abandoned" insert -- which in turn is a continuation in part of application Serial No. 166,679, filed January 16, 1962, now abandoned. --.

Signed and sealed this 10th day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents